US012422059B2

(12) United States Patent
Dunn et al.

(10) Patent No.: US 12,422,059 B2
(45) Date of Patent: Sep. 23, 2025

(54) SPARTAN MARKER TAPE

(71) Applicant: EAS IP, LLC, Charlottesville, VA (US)

(72) Inventors: Ryan C. Dunn, Charlottesville, VA (US); Joshua M. Parman, Palmyra, VA (US)

(73) Assignee: EAS IP, LLC., Charlottesville, VA (US)

( * ) Notice: Subject to any disclaimer, the term of this patent is extended or adjusted under 35 U.S.C. 154(b) by 872 days.

(21) Appl. No.: 16/584,913

(22) Filed: Sep. 26, 2019

(65) Prior Publication Data

US 2021/0095788 A1 Apr. 1, 2021

(51) Int. Cl.
| | |
|---|---|
| *G01V 3/08* | (2006.01) |
| *F16L 1/11* | (2006.01) |
| *G01V 3/165* | (2006.01) |
| *G01V 15/00* | (2006.01) |
| *G06K 19/07* | (2006.01) |

(52) U.S. Cl.
CPC ........ *F16L 1/11* (2013.01); *G01V 3/08* (2013.01); *G01V 3/165* (2013.01); *G01V 15/00* (2013.01); *G06K 19/0723* (2013.01); *H02G 2200/20* (2013.01)

(58) Field of Classification Search
CPC ......... A61B 5/242; A61B 5/243; A61B 5/245; A61B 2562/0223; A61B 2562/046; G01R 33/0011; G01R 33/0023; G01R 33/0094; G01R 33/0206; G01R 33/091; G01R 33/0041
USPC ........................................................ 600/409
See application file for complete search history.

(56) References Cited

U.S. PATENT DOCUMENTS

| | | | | |
|---|---|---|---|---|
| 2,993,806 A | * | 7/1961 | Fisher | B44F 1/02 204/192.12 |
| 3,282,057 A | * | 11/1966 | Prosser | F16L 1/11 174/37 |
| 3,382,136 A | * | 5/1968 | Bugel | B32B 15/08 428/921 |
| 3,455,775 A | * | 7/1969 | Pohl | B32B 15/08 216/34 |
| 3,568,626 A | * | 3/1971 | Southworth, Jr. | H02G 9/025 174/37 |
| 3,633,533 A | * | 1/1972 | Allen | H02G 9/025 174/37 |
| 3,977,053 A | * | 8/1976 | Takamatsu | A44B 19/04 24/413 |
| 4,623,282 A | * | 11/1986 | Allen | F16L 1/11 930/DIG. 698 |
| 4,699,838 A | * | 10/1987 | Gilbert | B32B 15/08 138/104 |

(Continued)

*Primary Examiner* — Christopher P McAndrew
(74) *Attorney, Agent, or Firm* — Paul A. Bell

(57) ABSTRACT

Applicants have discovered that an inexpensive marker tape can be made from some of the components used in applicants Signal Tape disclosed in PCT/US2017/050405. This marker tape, called Spartan Marker Tape, has elongated upper and lower protective layers made from a thermoplastic material which are laminated together with a locating device inside the laminated layers. Various locating devices may be used in the Spartan Marker Tape, such as conventional RF or RFID tags. In addition, magnetic tags, or radioactive tags may be used. Of course, classsis marker wire may also be used as a locating device.

15 Claims, 11 Drawing Sheets

(56) References Cited

U.S. PATENT DOCUMENTS

| | | | | |
|---|---|---|---|---|
| 4,767,237 A * | 8/1988 | Cosman | ............... | H02G 9/025 |
| | | | | 174/37 |
| 4,781,958 A * | 11/1988 | Gilbert | ............... | B32B 27/32 |
| | | | | 428/458 |
| 4,988,236 A * | 1/1991 | Ramsey | ............... | F16L 1/11 |
| | | | | 405/157 |
| 5,122,750 A * | 6/1992 | Rippingale | ............... | G02B 6/562 |
| | | | | 324/345 |
| 5,178,495 A * | 1/1993 | Cameron | ............... | F16L 1/11 |
| | | | | 424/416 |
| 6,092,558 A * | 7/2000 | Maccario | ............... | F16L 1/11 |
| | | | | 138/104 |
| 6,333,633 B1 * | 12/2001 | Honjo | ............... | G01R 31/2805 |
| | | | | 324/537 |
| 10,983,179 B2 * | 4/2021 | Ishida | ............... | G01R 33/09 |
| 11,002,806 B2 * | 5/2021 | Masuda | ............... | G01R 33/0017 |
| 2007/0167703 A1 * | 7/2007 | Sherman | ............... | A61B 5/06 |
| | | | | 600/407 |
| 2008/0252449 A1 * | 10/2008 | Colvero | ............... | G01C 15/04 |
| | | | | 340/540 |
| 2012/0217960 A1 * | 8/2012 | Ausserlechner | ............... | H10N 50/10 |
| | | | | 324/252 |
| 2013/0052760 A1 * | 2/2013 | Cho | ............... | H01L 22/14 |
| | | | | 438/15 |
| 2014/0196944 A1 * | 7/2014 | Loibl | ............... | H05K 3/0014 |
| | | | | 264/619 |
| 2015/0158220 A1 * | 6/2015 | Ikeda | ............... | G01D 11/245 |
| | | | | 264/263 |
| 2015/0253412 A1 * | 9/2015 | Jost | ............... | G01R 33/091 |
| | | | | 324/202 |
| 2017/0231573 A1 * | 8/2017 | Reiner | ............... | A61M 5/14276 |
| | | | | 600/301 |
| 2018/0259676 A1 * | 9/2018 | Dunn | ............... | G01V 3/165 |

* cited by examiner

SPARTAN MARKER TAPE

RELATED APPLICATIONS

This application is related to commonly owned US International Patent Application PCT/US2017/050405 entitled Signal Tape, filed on 7 Sep. 2017. This application incorporates by reference the disclosure of commonly owned US application PCT/US2017/050405.

COPYRIGHT NOTICE

A portion of the disclosure of this application contains material which is subject to copyright protection. The copyright owner has no objection to the facsimile reproduction by anyone of the patent document or the patent disclosure, as it appears in the Patent and Trademark Office patent files or records, but otherwise reserves all copyright rights.

GOVERNMENT SUPPORT

None.

FIELD OF THE INVENTION

The present invention relates generally to the field of creating a localized warning to prevent damage to buried pipeline and other buried infrastructure. The present invention may also use RFID locating technology, RF locating technology, marker wire locating technology and/or magnetic locating technology combined with the localized warning system. The principal objective of the present invention is to provide a very inexpensive marker tape to be buried above buried infrastructure.

BACKGROUND

Localized Warning Systems

There are a number of passive systems used to provide a warning of imminent excavation damage to underground utilities. Currently, marker tape is the standard protective measure used in new installations of pipelines. Laying marker tape, a passive visual indicator, is well-known and easily done by pipeline installation crews. Marker tape comes in a variety of widths and flexible materials. Some contain metallic components such as wire or foil, the purpose of which is to aid in locating—from the surface—the tape [and thus the pipeline] after it has been installed [buried underground and above the pipeline]. This location is performed using electronic methods.

FIG. 1 shown a prior art marker tape installation viewed along the length of the buried utility. Buried utility 3 is emplaced under the soil surface 1 at approximately a four (4) foot depth [approximately 1.22 meters]. A marker tape 2 of the type disclosed by Allen [U.S. Pat. No. 3,115,861; 3,504,503 or 4,623,282] is buried above buried utility 3 and about two (2) feet [approximately 0.61 meters] below the soil surface 1. FIG. 2 shows the same setup as FIG. 1 but from a side view.

Gordon H. Allen received U.S. Pat. Nos. 3,115,861 and 3,504,503 directed to marker tape to protect buried facilities. The tape includes printed indicia identifying the type of underground facility with the printed indicia protected from the environment. The tape also includes a metal foil so that the tape may be detected from the ground surface with known electronic locating instruments. The tape is color coded to the type of underground facility and has soil contrasting reflective stripes to aid in tape detention. The previous Allen disclosures also teach that the tape will be color coded in the accepted coding for the type of utility line being protected. The uniform color code generally accepted in the industry to identify underground facilities is as follows: Red—electric power lines; Yellow—gas, oil or steam lines; Orange—telephone, police and fire communications and cable television; Blue—water lines; and Green—sewer lines.

Allen, in U.S. Pat. No. 4,623,282 [hereinafter "Allen '282"] is concerned with keeping the indicia and coloring legible on the buried tapes. As shown in FIG. 3 [taken from Allen '282], a utility pipe 5 is buried under ground surface 1'. Marker tape 4 is buried directly over pipe 5 between the ground surface 1' and pipe 5. It was found that the cautionary printing on the tape surface of the previous Allen marker tapes was vulnerable to being removed by erasure, rubbing off, chemical activity under the ground by hydrocarbons, and by underground electrolysis. Thus, after a period of time, the cautionary printing disappears from his previous marker tapes due to scratching or rubbing off, and also due to natural causes from the effects of hydrocarbons or petroleum present under the ground and this renders the supplied cautionary printing indicia useless as a means of identifying the type of utility element supposedly being protected. To this end, as shown in FIGS. 4 and 5 [taken from Allen '282], Allen '282 provides for a frangible marker tape 4 which carries cautionary printed indicia 18 with color coded indicia stripes 20 and contrasting color coded stripes 22. The Allen '282 stripes 20 may indicate the type of buried facility using the above-noted uniform color code. However, as Allen notes the soil color may make these colored stripes hard to see.

So Allen '282 provides a contrasting color coding [i.e., stripes 22] to make the tape easy to see. It is possible and even likely that the coded tape color corresponding to the associated utility line or element of construction does not form a contrast with the surrounding earth soil sufficient to reliably caution one digging in the soil. For example, when a red colored locating tape associated with electric power lines, etc. is placed in red-colored soil such as sandstone or reddish clay, the desired contrast between the locating tape color and the surrounding soil is not present. Similarly, orange coded tapes often do not provide sufficient contrast in desert soils, and green coded and blue coded tapes are often problems in heavily forested or shaded areas. In such instances, the utility line may be damaged before one can see the cautionary locating tape.

Cautionary printed indicia 18 is repeated on the tape so that it extends the full length of utility line 14. Marker tape 4 also included cautionary coded indicia 20 in the form of colored stripes extending across tape 16. In the illustrated example of FIGS. 3, 4 and 5, line 5 is assumed to be a water line, therefore according to the uniform industry code, cautionary stripes 20 are blue stripes. Marker tape 4 further includes cautionary contrast stripes 22 extending across the tape and forming a contrast in color with color coded stripes 20 as well as with the color of the surrounding soil. Contrast stripes 22 provide a high visibility and high light reflective characteristic to marker tape 4 so that the tape can readily be seen when placed in earth soils whose color is close to the color of color coded stripes 20. As shown in FIG. 5, cautionary indicia 18 is reverse printed on the underside of clear polyester plastic film 24 thus protecting the cautionary indicia from scratching or rubbing off. A flexible metal foil 26 [for example Aluminum] with a highly reflective surface is provided with color coded stripes 20 so that highly visible and reflective stripes 22 are formed on the surface of Aluminum foil 26. The printed surface of foil 26 is then placed adjacent the printed surface of clear plastic film 26 and the two are bonded together with adhesive 29. To protect the bottom of Aluminum foil layer 26 another clear polyester film is bonded to the undersurface of foil 26 by adhesive 30.

Allen '282 defines what he means by a "frangible" marker tape as follows: the strength of the locating tape is such that in conventional digging into the soil, in connection with excavating, laying utility lines or elements of construction or cutting into the earth for any other reason by means of mechanical or similar digging or excavating equipment such as back hoes or trenchers, if the locating tape is engaged and pulled up by such equipment, the teeth or the like on the equipment will sheer, sever or break the tape and the tape will be ripped from the earth and pulled loose for several feet along its length.

Unfortunately, even the improved Allen '282 locating tape tends to be quickly severed by the excavator bucket or scoop and little visible material is left in the thus exposed trench to be seen by an observer. The material severed by the bucket or scoop is contained within the soil in the bucket or scoop and is also not visible to an observer or the equipment operator.

Southworth in U.S. Pat. No. 3,568,626 [hereinafter Southworth '626] discloses a marker tape which is designed to be pulled from the soil when contacted by the bucket or scoop of excavation equipment. As shown in FIGS. 6, 7, and 8, Southworth '626 provides a marker tape 38, 38' which is designed to be buried above a buried utility 37 so that the indicating assembly will be contacted by the excavation equipment before contacting the buried utility. Marker tape 38, 38' is an elongated extensible vinyl sheet 40 folded about two nylon cords 42, 44 of approximately one-quarter inch in diameter. The vinyl may, for example, be polyethylene and have the ability to stretch to up to eight times its length before breaking. The nylon cords are preferable stretchable up to three or four times their length. Such materials are described in "The Handbook of Chemistry and Physics," 41st Edition, published by Chemical Rubber Publishing Company of Cleveland, Ohio. The cords 42, 44 fit into the longitudinal folds in the sheet 40 so as to form elongated ridges at the edges of the marker tape 38, 38'. A suitable adhesive on one face of the sheet material 40 secures the cords 42, 44 in place and holds the edges of the sheet 40 against the central portion of the sheet 40 so as to form the substantially unitary assembly of FIG. 8. When the marker tape 38, 38' is buried above a utility line, an operator of automatic excavating equipment, a plow, or a laborer with a shovel, upon hitting the marker tape 38, 38', starts to bring it up with his implement. In doing so, he can notice the resistance afforded by the ribbon. The latter, in response to the effort of the implement, yields elastically so that a portion of it becomes visible above the portion of the soil being dug. A suitable legend 46 [e.g., "DANGER"] on the surface of the ribbon then apprises the operator of the existence of the utility. The legend 46 in FIG. 8 also includes an indication that marker tape 38 38' has applied thereto magnetic coding signals 48 and radioactive coding signals 50. It instructs the operator that the path of the utility line may be followed by sensing the successive coding signals along its path with suitable sensing equipment above ground.

Southworth '626 teaches that his nylon cords 42, 44 are strong enough to cause marker tape 38, 38' to be pulled to the surface when encountered by excavation machinery. However, Evett, U.S. Pat. No. 3,908,582 teaches that the Southworth '626 tape, while intended to be infrangible and of such strength and sufficiently stretchable that a substantial portion of the Southworth '626 tape will be pulled by the excavation machinery to a more observable position, will have portions of the tape adjacent the trench dug by the excavation equipment sheer before being pulled from highly compacted soil—thus preventing the Southworth tape from being stretched to a readily observable longitudinal extent.

RFID Technology

A number of RFID devices have been developed to detect and protect underground utilities. For example, the 3M™ EMS Caution Tape 7600 Series provides a caution tape which may be installed near or above a buried infrastructure such as a natural gas line, a telephone line, power line, water line or any other type of buried infrastructure. The markers comprise small RFID devices attached to a known marker tape. The devices operate with a reader such as the 3M™ Dynatel™ Locator 700 Series. The RFID markers require no on-board batteries and do not require an external transmitter hooked up to the marker tape or the use of access points. The markers work independently, so that—even if a section of the caution tape is cut or removed—the other markers on the tape continue to provide location information. The caution tape is provided in the standard underground utility colors and the markers are tuned to the industry standard frequency specific to the various types of underground utilities [gas, telco, wastewater, etc.]. The 3M™ EMS Caution Tape 7600 Series can function down to a burial depth of 2 feet [0.61 m].

Another 3M™ product for marking underground infrastructure is 3M™ EMS Rope 7700 Series. The rope comprises a polyester rope with EMS markers installed about every 8 feet along the rope. As with the caution tape a cut in the rope does not affect the functioning of the remaining markers. The rope is strong enough to be buried down to 4 feet (1.2 m) through rugged terrain.

The Spartan Marker Tape of this invention may incorporate RFID tags similar to those used in the 3M™ EMS Caution Tape 7600 Series as discussed above. The Spartan Marker Tape of this invention may also incorporate RF tags or magnetic locating devices.

SUMMARY OF THE INVENTION

The disclosed Spartan Marker Tape comprises two sheets of elongated protective material joined together with one or more locating devices being contained inside the two sheets. These sheets of elongated protective material will normally comprise known thermoplastic materials [e.g., polyethylene, polyvinylidene chloride [Saran], polyvinyl chloride, cellulose acetate-butyrate, polystyrene and acrylonitrile]. The elongated thermoplastic sheets are laminated together by adhesive, heat sealed together, ultrasonically welded or otherwise joined together in any known manner. The elongated protective material is also designed to be pulled from the ground [at least in part] and color coding, warning and coding indicia and other indicia [instructions for example] are emplaced upon the elongated protective material.

The disclosed Spartan Marker Tape is also designed to be used with embedded RFID tags which, as noted above may be similar [or identical] to those used in the 3M™ EMS Caution Tape 7600 Series as discussed above. The Spartan Marker Tape of this invention may also use polyester rope to hold the locating devices and, in some instances, the tape may incorporate polyester rope with embedded RFID tags similar to the 3M™ EMS Rope 7700 Series discussed above. RFID tags have added circuitry which will provide a considerable amount of information to the surface interrogation device.

The disclosed Spartan Marker Tape is also designed to be used with simple RF tags. The difference between an RFID tag and an RF tag is that the RF tag simply has a coil which can be excited by the surface transmitter and which will emit a signal which can be detected. Unlike an RFID tag, there is little or no other circuitry; however, you can tune the coil such that it is only excited by certain frequency transmissions such that you can determine at least some ID information—if different frequencies are assigned to different types of underground utilities. For example, one frequency could be assigned for power lines and such, another for natural gas, oil or petroleum lines—another frequency for water and so on. In this manner, even with simple RF locating tags at least some information about the underground utility can be delivered to the surface interrogation device. Of course, with RFID tags much more information is available; however, RFID tags may require on-board power sources. Simple magnetic tags may also be used. Permanent magnets may also be emplaced on the Spartan Marker Tape such that they can be detected from the surface.

The disclosed Spartan Marker Tape is designed such that when installed near and/or over a pipeline or other buried infrastructure, the tape will be in a position such that an excavator digging near the pipeline will encounter the tape first [before encountering the pipeline] and drag a portion of the tape above the surface such that the tape can be observed by a spotter or even the excavator operator. The normal burial depth for Spartan Marker Tape is approximately 1 foot [approximately 0.3 meters] below the soil surface. This depth can change for a number of reasons. It is unlikely to be too much less than 1 foot [approximately 0.3 meters] because of the potential for erosion to expose the marker tape which is not desirable for obvious reasons. Burial at depths much greater than 1 foot [2 feet {approximately 0.61 meters}, 3 feet {approximately 0.91 meters}, 4 feet {approximately 1.22 meters} or more], of course, means that the underground infrastructure which the Spartan Marker Tape is designed to protect is buried at a greater depth because the Spartan Marker Tape must be [for obvious reasons] buried directly above the buried infrastructure. The other problem with a much greater than 1 foot burial depth for the Spartan Marker Tape is that it is harder to detect using known locator technology the deeper it is buried. In addition, the deeper the burial depth, the more difficult it is to bring the Spartan Marker Tape to the surface with an excavator since it takes much greater energy to move the tape out of the soil—meaning that it is more likely for the tape to break and fail to provide a proper warning signal. For example, various field conditions such as density, soil composition, climate, etc., etc can affect the desired burial depth.

DETAILED DESCRIPTION

Since FIGS. 1-8 have already been described above in the BACKGROUND section, the inventive Spartan Marker Tape shown in FIGS. 9-XX will now be described.

Figure 1:
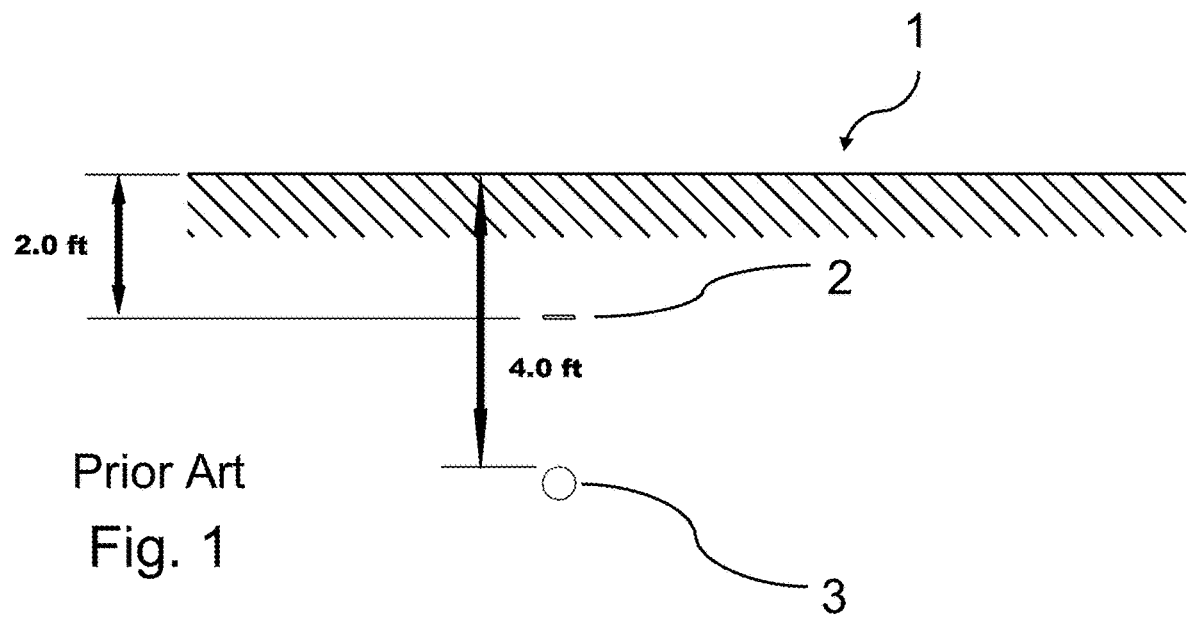
FIG. 1 shows a cross-sectional view of a prior art marker tape emplaced over a buried infrastructure.
Figure 2:
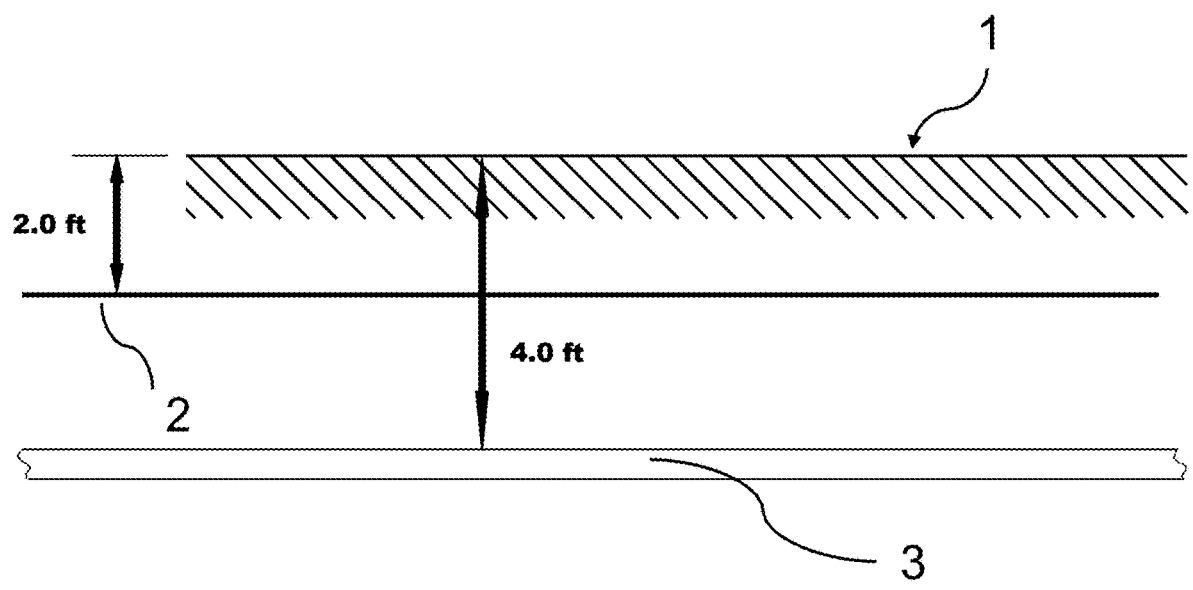
FIG. 2 shows a side view of the prior art marker tape installation of FIG. 1.
Figure 3:
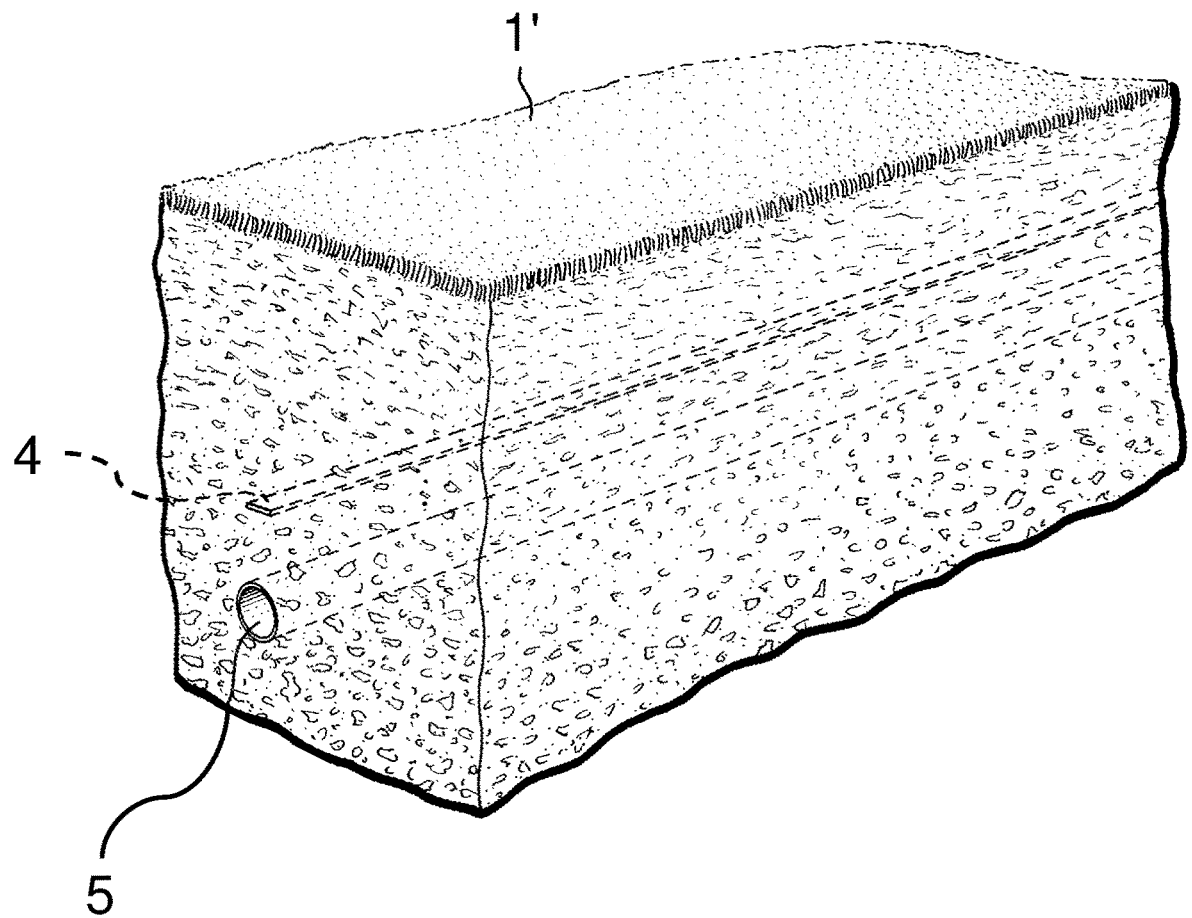
FIG. 3 shows a prior art marker tape installation taken from Allen, U.S. Pat. No. 4,623,282.
Figure 4:
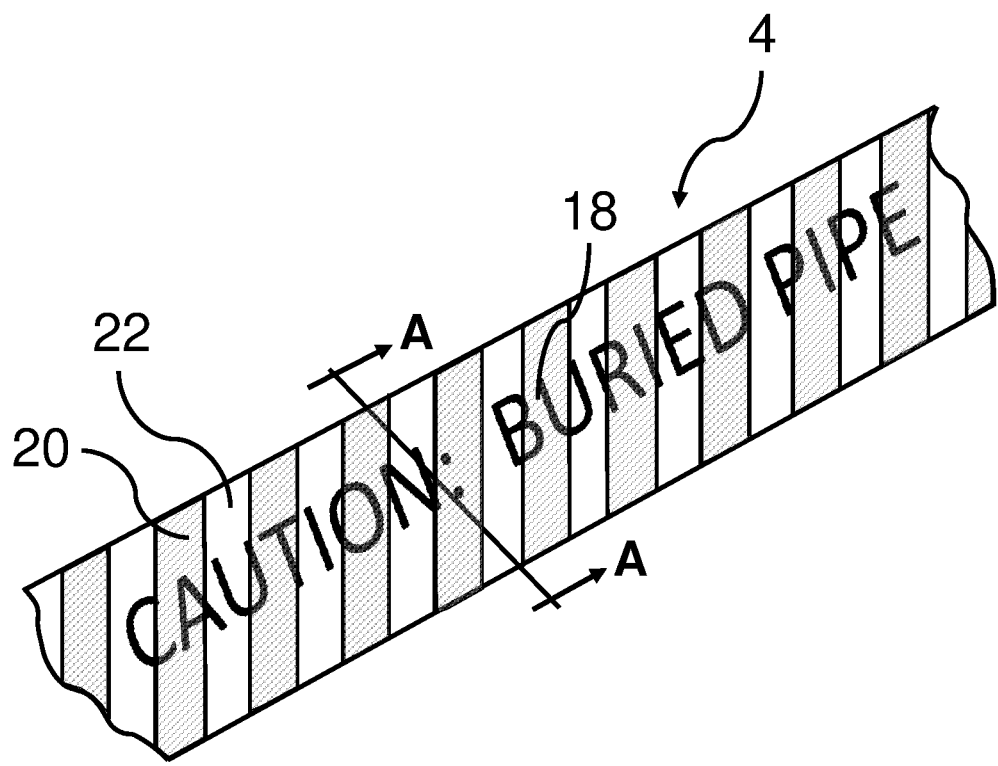
FIG. 4 shows a prior art marker tape as shown in Allen, U.S. Pat. No. 4,623,282.
Figure 5:
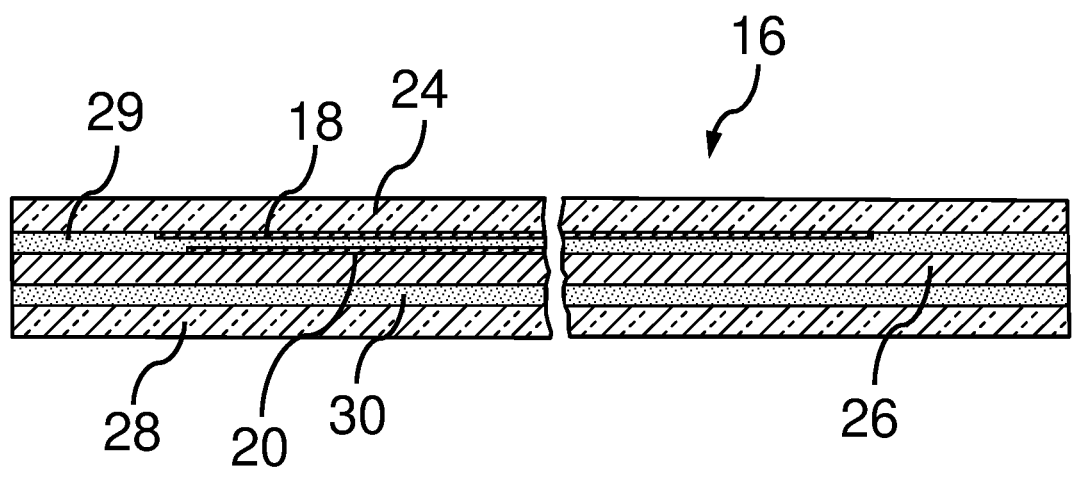
FIG. 5 shows a cross-sectional view taken along plane A-A of FIG. 4.
Figure 6:
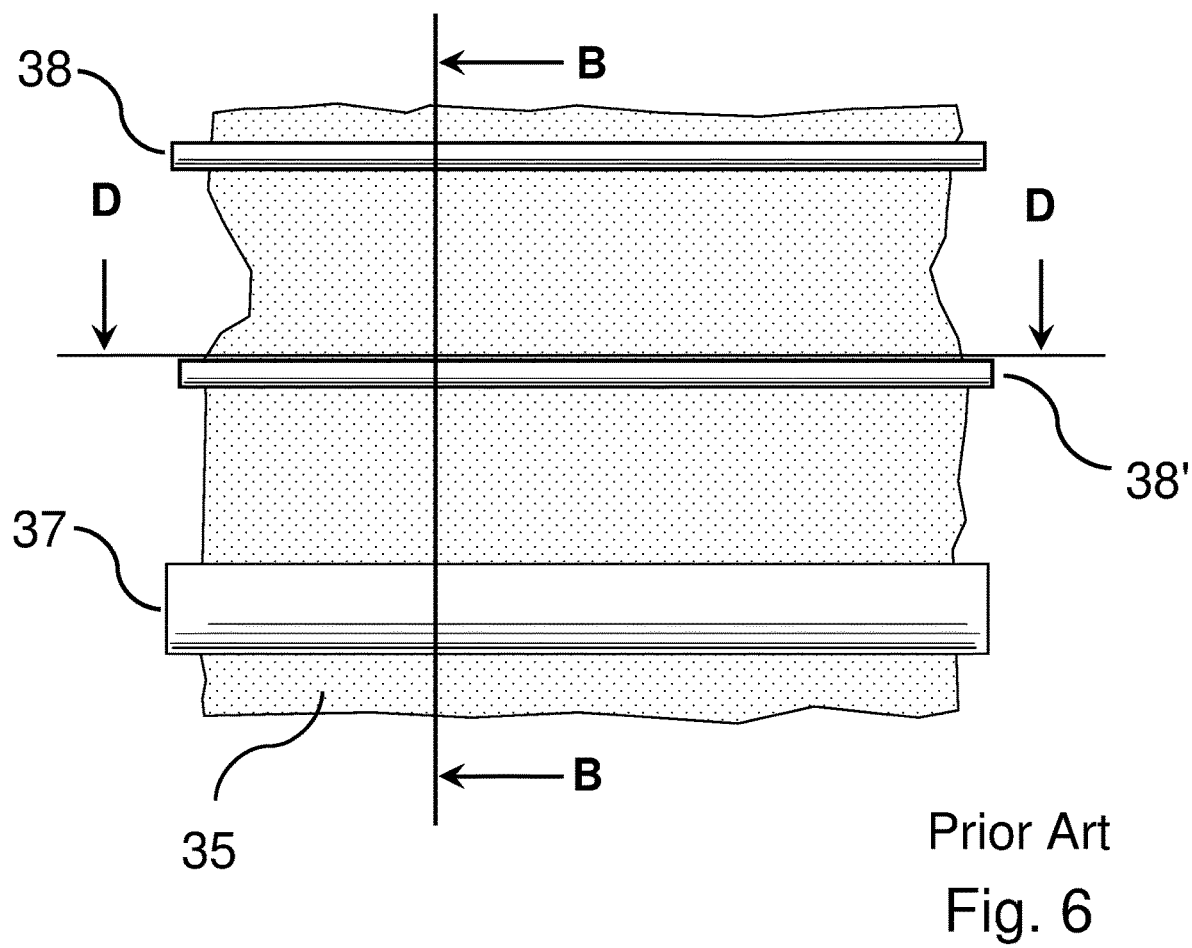
FIG. 6 shows a second prior art marker tape installation taken from Southworth, Jr. U.S. Pat. No. 3,568,626.
Figure 7:
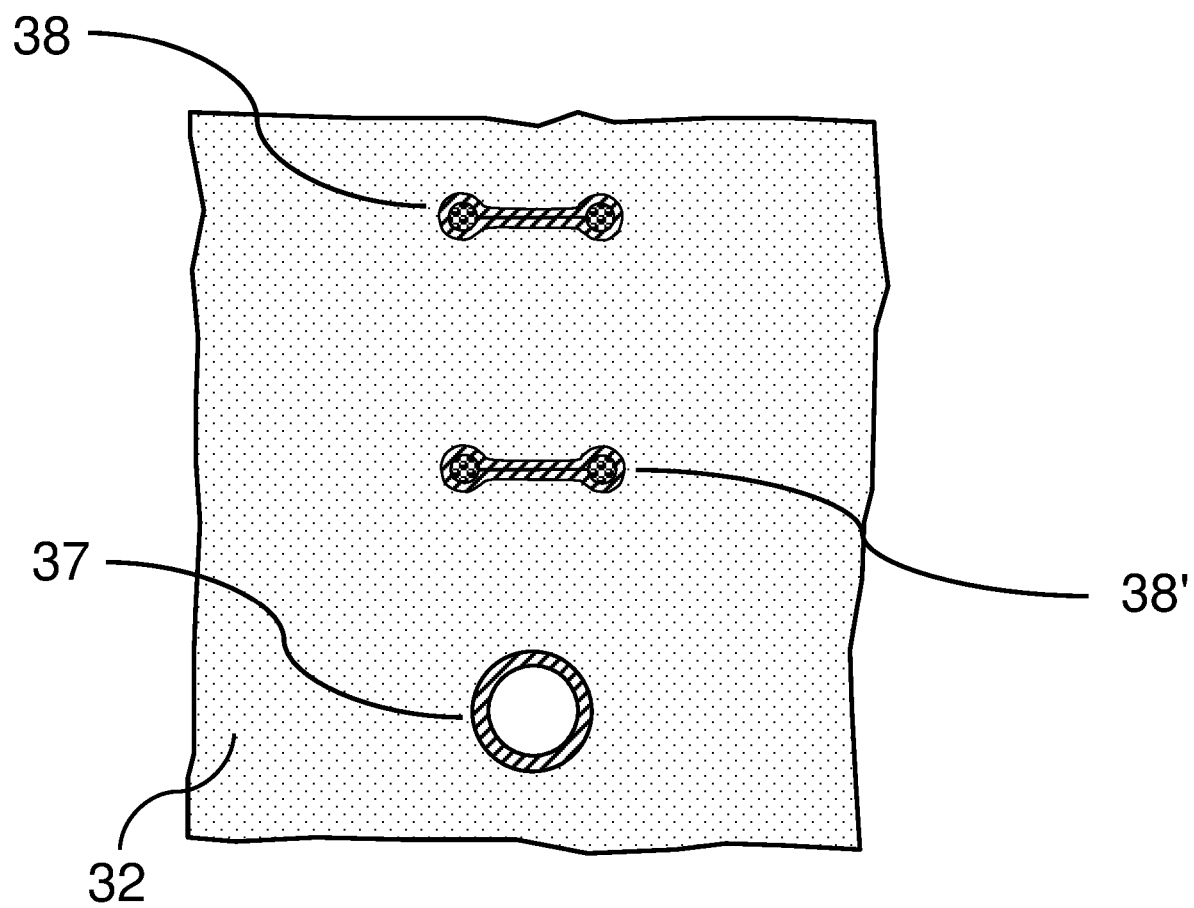
FIG. 7 shows a cross-sectional view of the installation of FIG. 5 taken along plane B-B of FIG. 6.
Figure 8:
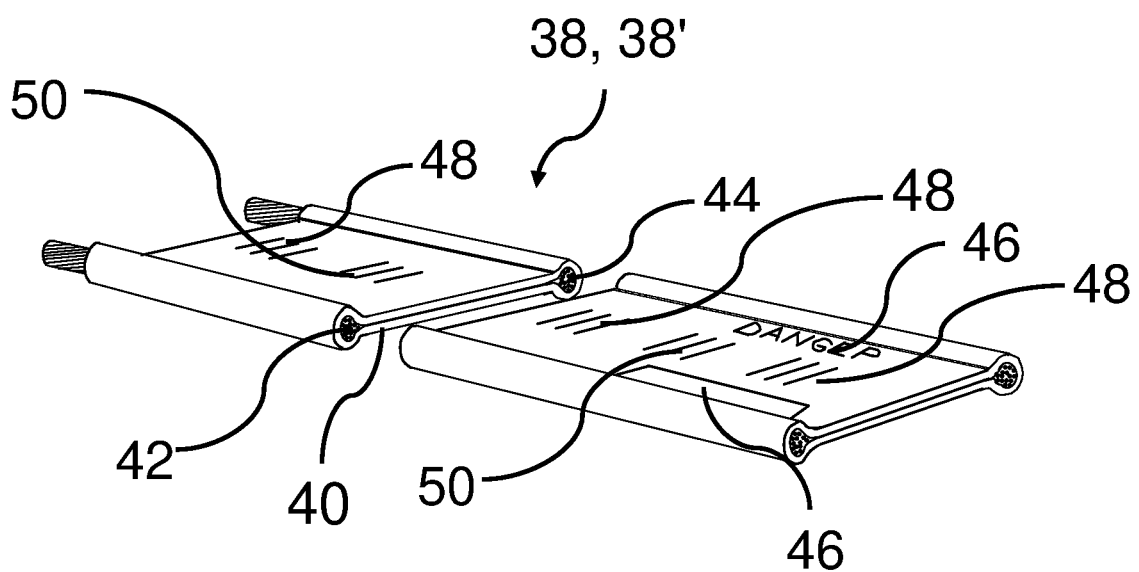
FIG. 8 shows a perspective view of the marker tape of Southworth, Jr. U.S. Pat. No. 3,568,626.
Figure 9:
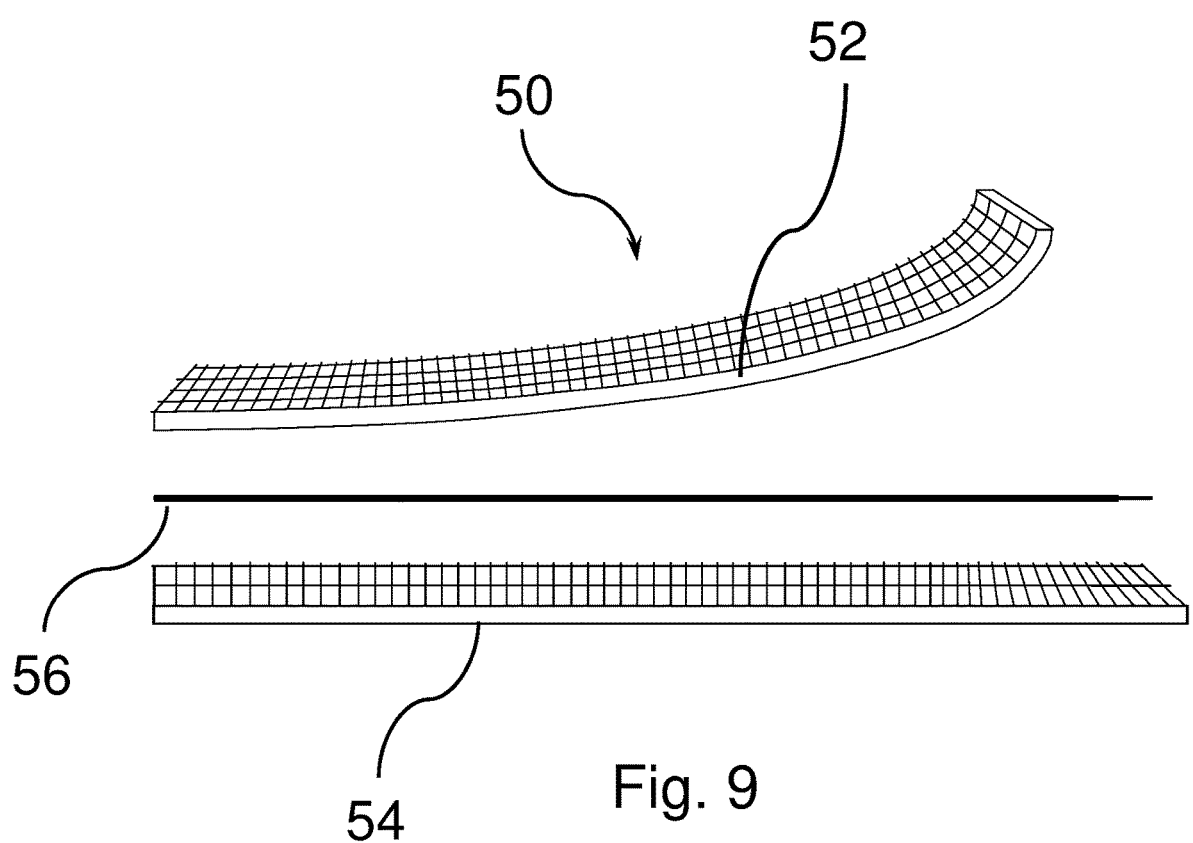
FIG. 9 shows a blown-up view of the marker tape of the invention with a marker wire therein.

FIG. 9 shows the Spartan Marker Tape 50 of the invention with upper protective layer 52, marker wire 56 and lower protective layer 54. Marker wire 56 would be enclosed within upper protective layer 52 and lower protective layer 54 to protect marker wire 56 from the soil it is to be buried in. Upper protective layer 52 and lower protective layer 54 are laminated together by use of adhesive means [not shown] or by heat sealing, ultrasonic welding or any other suitable joining means.

Figure 10:
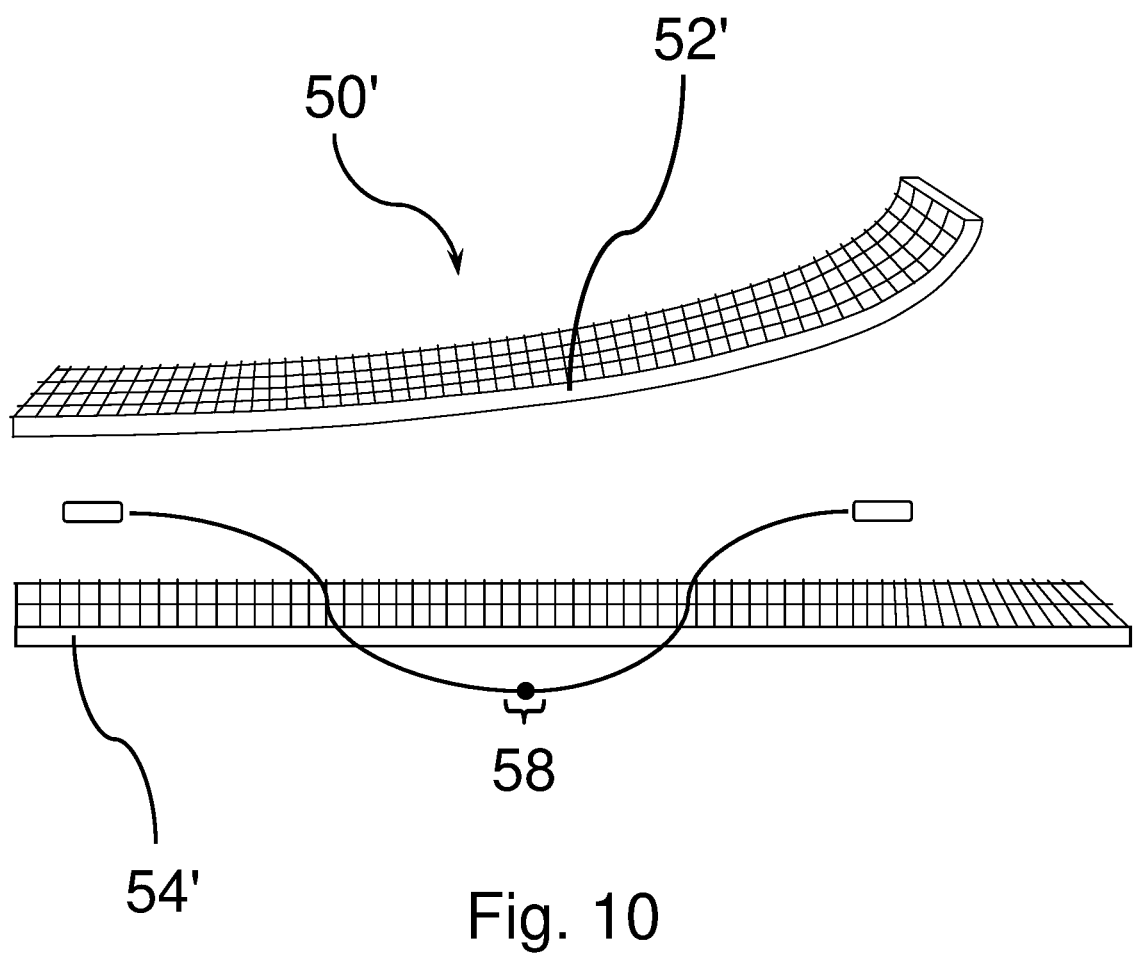
FIG. 10 shows another embodiment of the marker tape of the invention with RFID tags therein.

FIG. 10 shows another embodiment of the Spartan Marker Tape 50' of the invention with RFID tags 58 enclosed within top protective layer 52' and lower protective layer 54'. RFID tags 58 would be enclosed within upper protective layer 52' and lower protective layer 54' to protect tags 58 from the soil it is to be buried in. Upper protective layer 52' and lower protective layer 54' are laminated together by use of adhesive means [not shown] or by heat sealing, ultrasonic welding or any other suitable joining means. These RFID tags might be similar [or identical] to the RFID tags used in the 3M™ EMS Caution Tape 7600 Series mentioned above. The tags would be secured to the Spartan Marker Tape every 8 feet or so although the RFID tag interval could be more or less, as desired.

Figure 11:
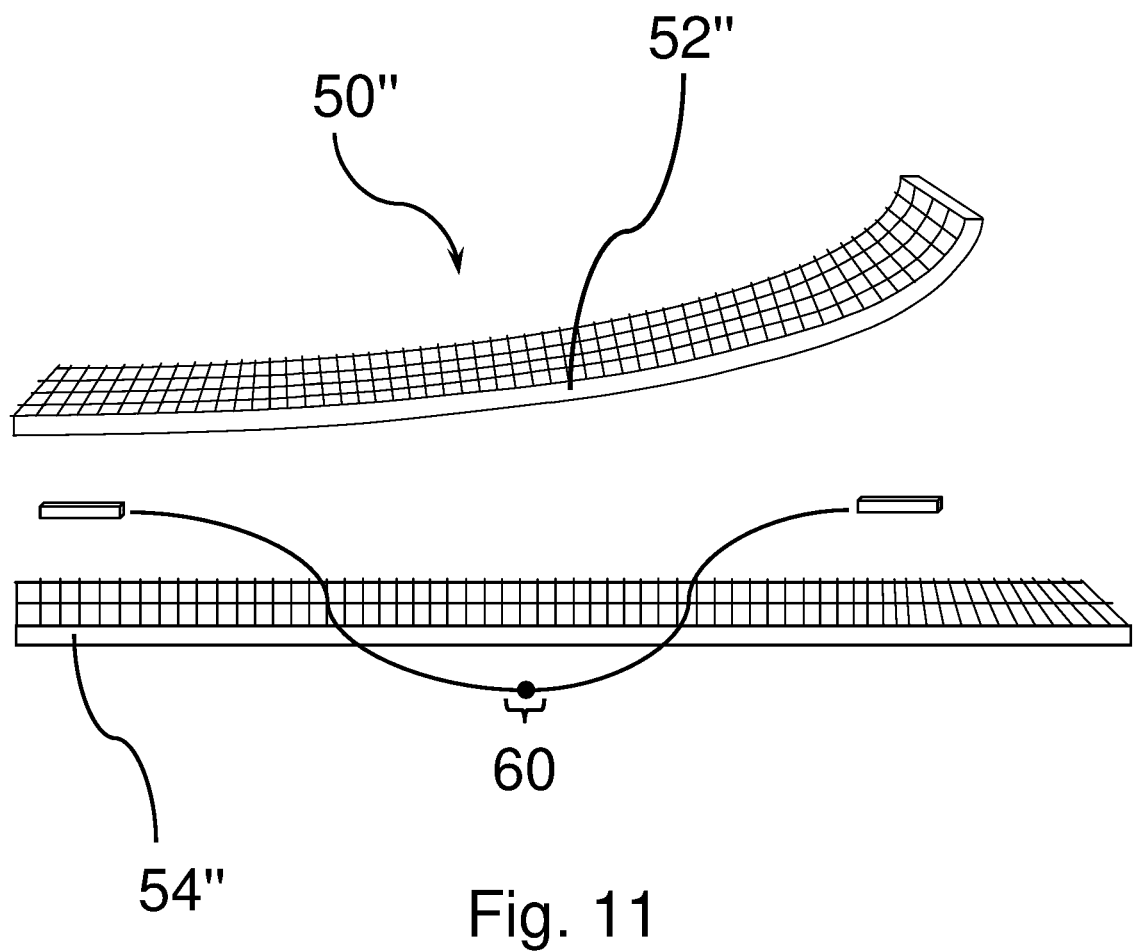
FIG. 11 shows another embodiment of the marker tape of the invention with magnetic locating devices laminated to the interior of Spartan Marker Tape.

FIG. 11 shows Spartan Marker Tape 50" with magnetic locating means 60 located between top protective layer 52" and lower protective layer 54". Magnetic locating means 60 would be enclosed within upper protective layer 52" and lower protective layer 54" to protect locating means 60 from the soil it is to be buried in. Upper protective layer 52" and lower protective layer 54" are laminated together by use of adhesive means [not shown] or by heat sealing, ultrasonic welding or any other suitable joining means.

Figure 12:
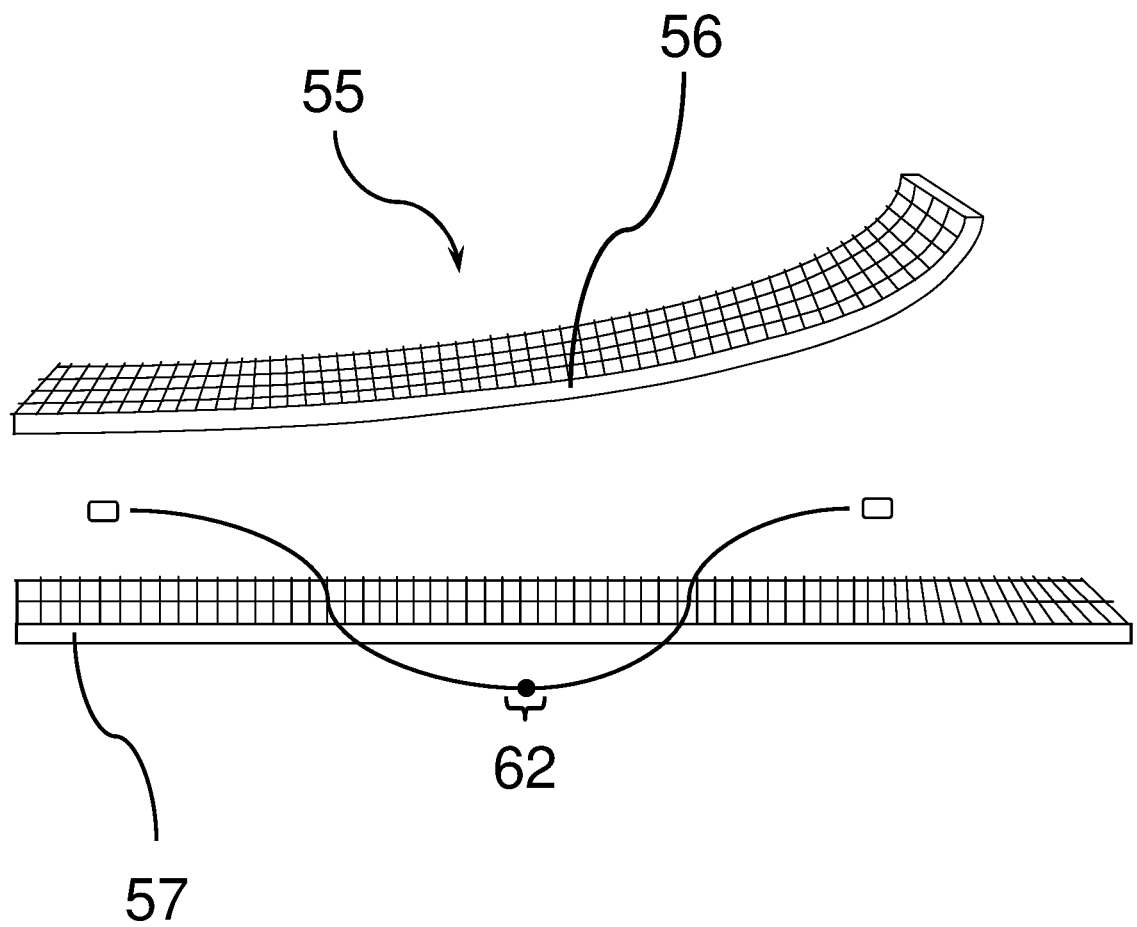
FIG. 12 shows an embodiment of the marker tape of the invention with RF locating devices therein.

FIG. 12 shows Spartan Marker Tape 55 with RF locating devices 62. Upper protective layer 56 is laminated to lower protective layer 57 by adhesive means [not shown] or by heat sealing, ultrasonic welding or any other suitable joining means. Upper protective layer 56 may be adhered to lower protective layer 57 at the side edges thereof, or they may be adhered together across the width of upper protective layer 56 and lower protective layer 57. RF locating devices 62 would be spaced along Spartan Marker Tape 55 at intervals similar to the spacing of RFID tags 58 in FIG. 10.

Although not shown in the drawings, it is possible to have any or all of the various locating devices present in the same Spartan Marker Tape. It is noted that the use of radioactive markers on the Spartan Marker Tape is also possible. Note the teachings of Southworth Jr. '626 on this matter. It has also been found to be useful to treat the exposed surfaces of the upper and lower protective layers and their exposed edges so that they are hydrophobic. This means that soil and etc. will not stick to the exposed protective layers and thus, that they will be more visible in and out of the ground. It has also been found useful to treat the insulation layer of any marker wire installed in the Spartan Marker Tape so that it emits light when an electric current is run through the wire. It is possible to position diodes in the insulation to glow when an electric current is passed through the wire.

The invention claimed is:

1. Marker tape for marking the location of an underground utility comprising:
    an upper protective layer comprising an elongated strip of thermoplastic material, with said strip further comprising an upper surface, a lower surface and opposing side edges;
    a lower protective layer comprising an elongated strip of thermoplastic material, with said strip further comprising an upper surface, a lower surface and opposing side edges;
    said lower surface of said upper protective layer being laminated to said upper surface of said lower protective layer with adhesive means;
    said adhesive means comprising an adhesive layer which is applied to said upper surface of said lower protective layer only near the opposing side edges of said lower protective layer; and,
    locating means being enclosed within the laminated upper and lower protective layers.

2. Marker tape for marking the location of an underground utility comprising:
    an upper protective layer comprising an elongated strip of thermoplastic material, with said strip further comprising an upper surface, a lower surface and opposing side edges;
    a lower protective layer comprising an elongated strip of thermoplastic material, with said strip further comprising an upper surface, a lower surface and opposing side edges;
    locating means located between said upper protective layer and said lower protective layer;
    wherein said lower surface of said upper protective layer is laminated to said upper surface of said lower protective layer with said locating means being enclosed within the laminated upper and lower protective layers; and,
    wherein at least said upper surface of said upper protective layer and said lower surface of said lower protective layer are treated so as to be hydrophobic such that mud and soil will not readily stick to said surfaces.

3. The marker tape of claim 2 wherein the locating means comprises an elongated marker wire.

4. The marker tape of claim 2 wherein the locating means comprises multiple RFID tags spread along length of the upper surface of said lower protective layer at predetermined intervals.

5. The marker tape of claim 2 wherein the locating means comprises multiple RF tags spread along the length of the upper surface of said lower protective layer at predetermined intervals.

6. The marker tape of claim 2 wherein the locating means comprises multiple magnetic locating devices spread along the length of said upper surface of said lower protective layer of thermoplastic material at predetermined intervals.

7. The marker tape of claim 2 wherein said lower surface of said upper protective layer is laminated to said upper surface of said lower protective layer with adhesive means.

8. The marker tape of claim 7 wherein said adhesive means comprises an adhesive layer which is applied to the entire upper surface of said lower protective layer.

9. The marker tape of claim 7 wherein said adhesive means comprises the thermoplastic material comprising said upper and lower elongated protective layers and wherein said lower surface of said upper protective layer is laminated to said upper surface of said lower protective layer using a heat sealing process.

10. The marker tape of claim 7 wherein said adhesive means comprises the thermoplastic material comprising said upper and lower elongated protective layers and wherein said lower surface of said upper protective layer is laminated to said upper surface of said lower protective layer using an ultrasonic welding process.

11. The marker tape of claim 2 wherein warning indicia is imprinted on said upper protective layer.

12. The marker tape of claim 2 wherein warning indicia is imprinted on said lower protective layer.

13. The marker tape of claim 2 wherein the locating means comprises radioactive markers.

14. The marker tape of claim 2 wherein the locating means comprises an elongated marker wire, multiple RFID tags spread along the length of the upper surface of said lower protective layer at predetermined intervals, and multiple magnetic locating means spread along the length of the upper surface of said lower protective layer at predetermined intervals.

15. The marker tape of claim 14 wherein multiple radioactive locating means are interspersed with the other locating means.

* * * * *